United States Patent
Yu

(10) Patent No.: US 12,427,893 B2
(45) Date of Patent: Sep. 30, 2025

(54) ARRANGEMENT FOR COOLING A FUEL CELL AND AN ELECTRIC TRACTION AND/OR PROPULSION MOTOR OF A VEHICLE

(71) Applicant: Renault S.A.S., Boulogne-Billancourt (FR)

(72) Inventor: Robert Yu, Montigny le Bretonneux (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 434 days.

(21) Appl. No.: 17/995,790

(22) PCT Filed: Apr. 1, 2021

(86) PCT No.: PCT/EP2021/058653
§ 371 (c)(1),
(2) Date: May 15, 2023

(87) PCT Pub. No.: WO2021/204684
PCT Pub. Date: Oct. 14, 2021

(65) Prior Publication Data
US 2023/0271531 A1   Aug. 31, 2023

(30) Foreign Application Priority Data

Apr. 7, 2020  (FR) ..................... 2003450

(51) Int. Cl.
*B60L 58/33* (2019.01)
*B60H 1/00* (2006.01)
(Continued)

(52) U.S. Cl.
CPC .......... *B60L 58/33* (2019.02); *B60H 1/00278* (2013.01); *B60H 1/143* (2013.01);
(Continued)

(58) Field of Classification Search
CPC ..... B60L 58/33; B60L 58/34; B60H 1/00278; B60H 1/143; B60H 2001/00307;
(Continued)

(56) References Cited

U.S. PATENT DOCUMENTS 10,814,692 B2 * 10/2020 Kim .................. B60H 1/00278
2002/0053216 A1   5/2002 Ap et al.
(Continued)

FOREIGN PATENT DOCUMENTS

DE  10 2015 006 387 A1  12/2015
FR   2 816 258 A1   5/2002
(Continued)

OTHER PUBLICATIONS

Wikipedia (French edition) Moteur. Downloaded from the Wayback Machine, Mar. 25, 2020 (Year: 2020).*
(Continued)

*Primary Examiner* — Kito R Robinson
*Assistant Examiner* — Tanya C Sienko
(74) *Attorney, Agent, or Firm* — Oblon, McClelland, Maier &Neustadt, L.L.P.

(57) ABSTRACT

An arrangement for a vehicle includes a fuel cell, an electric traction and/or propulsion motor, and a single cooling circuit cooling the fuel cell and the electric motor. The cooling circuit includes two parts: a first, high-flowrate and high-temperature part including a high-temperature exchanger and a second, low-flowrate and low-temperature part including a low-temperature exchanger. The first part cools the fuel cell and the second part cools the electric motor. The first part includes a high-flowrate pump, in particular for a high flowrate of between 8000 l/h and 9000 l/h and the second part includes a low-flowrate pump, in particular for a low flowrate of between 2000 l/h and 3000 l/h.

13 Claims, 5 Drawing Sheets

(51) Int. Cl.
*B60H 1/14* (2006.01)
*B60K 11/02* (2006.01)
*B60L 58/34* (2019.01)
*H01M 8/04029* (2016.01)
*H01M 8/04223* (2016.01)
*H02K 9/00* (2006.01)

(52) U.S. Cl.
CPC ............... *B60K 11/02* (2013.01); *B60L 58/34* (2019.02); *H01M 8/04029* (2013.01); *H01M 8/04268* (2013.01); *B60H 2001/00307* (2013.01); *H01M 2250/20* (2013.01); *H02K 9/00* (2013.01)

(58) Field of Classification Search
CPC .. B60K 11/02; B60K 11/00; B60K 2001/003; B60K 2001/005; B60K 2001/006; B60K 1/00; H01M 8/04029; H01M 8/04268; H01M 2250/20; H02K 9/00; Y02E 60/50; Y02T 90/40; B60Y 2306/05
See application file for complete search history.

(56) References Cited

U.S. PATENT DOCUMENTS

| | | | |
|---|---|---|---|
| 2004/0221607 A1* | 11/2004 | Heyl | B60H 1/00907 62/324.1 |
| 2016/0032815 A1* | 2/2016 | Nguyen | B60K 6/22 903/902 |
| 2016/0101666 A1* | 4/2016 | Sugimura | B60H 1/00785 236/5 |
| 2018/0198138 A1* | 7/2018 | Bach | H01M 8/04268 |

FOREIGN PATENT DOCUMENTS

| | | | | |
|---|---|---|---|---|
| FR | 2 888 607 A1 | 10/2005 | | |
| WO | WO-2008098687 A1 * | 8/2008 | ............. | B60H 1/032 |

OTHER PUBLICATIONS

Machine translation of FR2816258 downloaded Feb. 5, 2025 (Year: 2025).*
Downloaded posted thread on public forum E90POST.com titled "water pump turning on after shutoff", available at https://www.e90post.com/forums/showthread.php?t=963795 See entry made Apr. 2, 2014 by scottp999. (Year: 2014).*
International Search Report mailed on May 18, 2021 in PCT/EP2021/058653 filed on Apr. 1, 2021 (citing references 1 and 15-17 therein, 2 pages).
Preliminary French Search Report dated Oct. 15, 2020 in French Application 2003450 filed on Apr. 7, 2020 (citing references 1 and 15-17 therein, 3 pages, with Translation of Categories).

* cited by examiner

ARRANGEMENT FOR COOLING A FUEL CELL AND AN ELECTRIC TRACTION AND/OR PROPULSION MOTOR OF A VEHICLE

TECHNICAL FIELD OF THE INVENTION

The invention relates to an arrangement for cooling a fuel cell, an electric traction and/or propulsion motor, and auxiliaries of this system for a vehicle, in particular a motor vehicle. The invention also relates to a vehicle comprising such an arrangement. The invention also relates to a method for operating such an arrangement.

PRIOR ART

A vehicle, in particular a motor vehicle, generally needs a large range, in particular for long journeys. Thus, a vehicle equipped with an electric traction and/or propulsion battery generally comprises a complementary source of electrical energy in order to limit the bulk, the mass and the price of the on-board battery. For example, a battery affords 300 km to 400 km of range and a complementary source, generally of the fuel cell type, affords a range of around 400 km for example. Generally, the complementary source is only used when the battery is discharged, this being the case when its charge reaches 20% of its total charge.

A vehicle comprising an electric traction and/or propulsion battery generally comprises a system for thermally managing or cooling the electric motor driven by the electrical energy from the battery and, more generally, a system for cooling the electric power chain (power electronics, DC voltage converters of the step-up and/or step-down type, charger, electric motor(s), etc.).

A vehicle comprising a means for producing electrical energy such as a fuel cell for its part also requires a system for cooling this means for producing electrical energy.

Thus, a vehicle comprising an electric battery supplying an electric traction and/or propulsion motor of the vehicle and a fuel cell requires cooling for the electric power chain and for the fuel cell.

However, the range of operating temperatures of the electric power chain linked to the traction and/or propulsion battery and the range of operating temperatures of the fuel cell are not identical, or even do not overlap. Moreover, the thermal power to be discharged from the fuel cell is much greater than the thermal power to be discharged from the electric power chain.

Presentation of the Invention

The aim of the invention is to provide an arrangement that overcomes the above drawbacks. In particular, the invention relates to a method for operating such an arrangement.

To achieve this objective, the invention relates to an arrangement for a vehicle, in particular for a motor vehicle, comprising:
- a fuel cell,
- an electric traction and/or propulsion motor, the arrangement comprising a single cooling circuit cooling the fuel cell and the electric motor, the cooling circuit comprising two parts:
- a first, high-flowrate and high-temperature part comprising a high-temperature exchanger, in particular a first part designed to cool the fuel cell, and
- a second, low-flowrate and low-temperature part comprising a low-temperature exchanger, in particular a second part designed to cool the electric motor.

The low-temperature exchanger may comprise an inlet and the high-temperature exchanger may comprise an outlet, the outlet of the high-temperature exchanger being able to be directly connected to the inlet of the low-temperature exchanger.

The arrangement may comprise an electric traction and/or propulsion chain of such a vehicle, the chain being able to comprise the electric traction and/or propulsion motor, a compressor and/or an intake air cooler, in particular for supercharged intake air, and/or one or more electronic power elements, the chain being able to be designed to be cooled by the second part of the cooling circuit.

The first part may comprise a high-flowrate pump, in particular for a high flowrate of between 8000 l/h and 9000 l/h, and the second part may comprise a low-flowrate pump, in particular for a low flowrate of between 2000 l/h and 3000 l/h.

The arrangement may comprise a unit heater for heating a passenger compartment of such a vehicle, the unit heater being able to be arranged on a branch of the first part of the circuit or being able to be arranged on the second part, in particular downstream of the cooling of the chain.

The invention also relates to a vehicle, in particular a motor vehicle, comprising an arrangement as defined above.

The invention also relates to a method for operating an arrangement as defined above, and, when the vehicle is running, the fluid admitted into the high-temperature exchanger is at a first temperature, in particular a first temperature of between 77 and 83° C. (171-181° F.), and exits at a second temperature, in particular a second temperature of between 71 and 77° C. (160-171° F.), and the fluid admitted into the low-temperature exchanger is, or is substantially, at the second temperature and exits at a third temperature, in particular a third temperature of between 62 and 68° C. (144-154° F.).

Before the fuel cell is started up, the first part and/or the second part of the cooling circuit may heat the fuel cell and/or maintain it at a predetermined temperature.

Before the fuel cell is started up, the unit heater may be passed through by the fluid so as to heat up the passenger compartment.

If the vehicle is operated with the energy from the battery, the high-flowrate pump may be stopped.

When the vehicle is running with only the energy from the fuel cell, and when the outside temperature is below zero, the heat energy released by the traction chain and the fuel cell may be transmitted to the cooling fluid passing through the unit heater, the circulation of the cooling fluid through the high- and low-temperature radiators or exchangers being able to be interrupted.

Presentation of the Figures

These subjects, features and advantages of the present invention will be set out in detail in the following description of embodiments, given by way of nonlimiting example with reference to the appended figures, in which.

DETAILED DESCRIPTION

Figure 1:
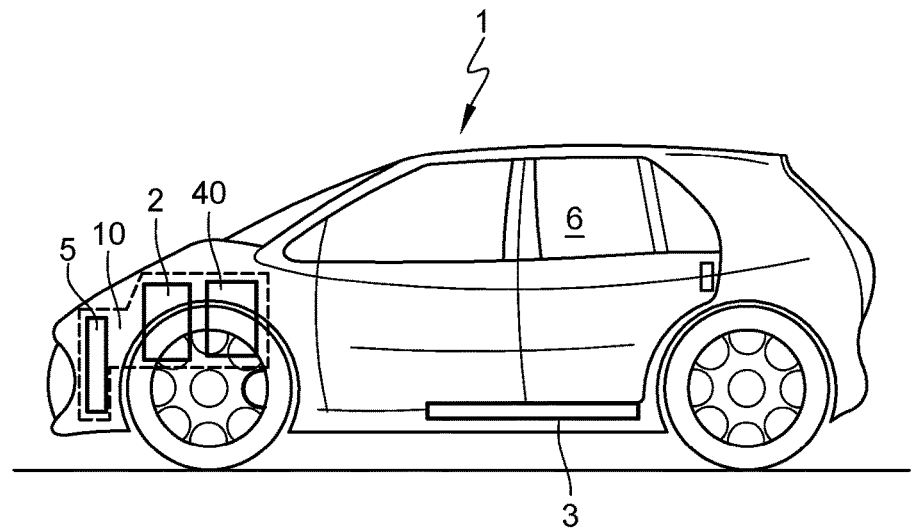
FIG. 1 is a schematic view of a vehicle according to one embodiment.

FIG. 1 schematically illustrates a vehicle, in particular a motor vehicle 1, according to one embodiment. The vehicle comprises a passenger compartment 6. The vehicle comprises a means for producing electrical energy, preferably a fuel cell 2. The vehicle also comprises an electric traction and/or propulsion battery 3 intended to store electrical energy. The vehicle also comprises an electrical traction and/or propulsion power chain 40 that is able to use the electrical energy supplied by the battery 3 and/or by the means for producing electrical energy, in order to move.

The vehicle also comprises an arrangement 10.

The arrangement 10 comprises the fuel cell 2 and an electric traction and/or propulsion motor 42 (shown in FIGS. 2-9). The arrangement 10 also comprises a single cooling circuit 5. Advantageously, the arrangement 10 comprises the electric power chain 40. The circuit 5 makes it possible to cool the fuel cell 2 and the electric motor 42. A fluid or liquid, for example deionized water, is intended to circulate within the cooling circuit 5.

Note that the vehicle preferably comprises a system for cooling the battery 3 that is independent of the cooling circuit 5.

Figure 2:
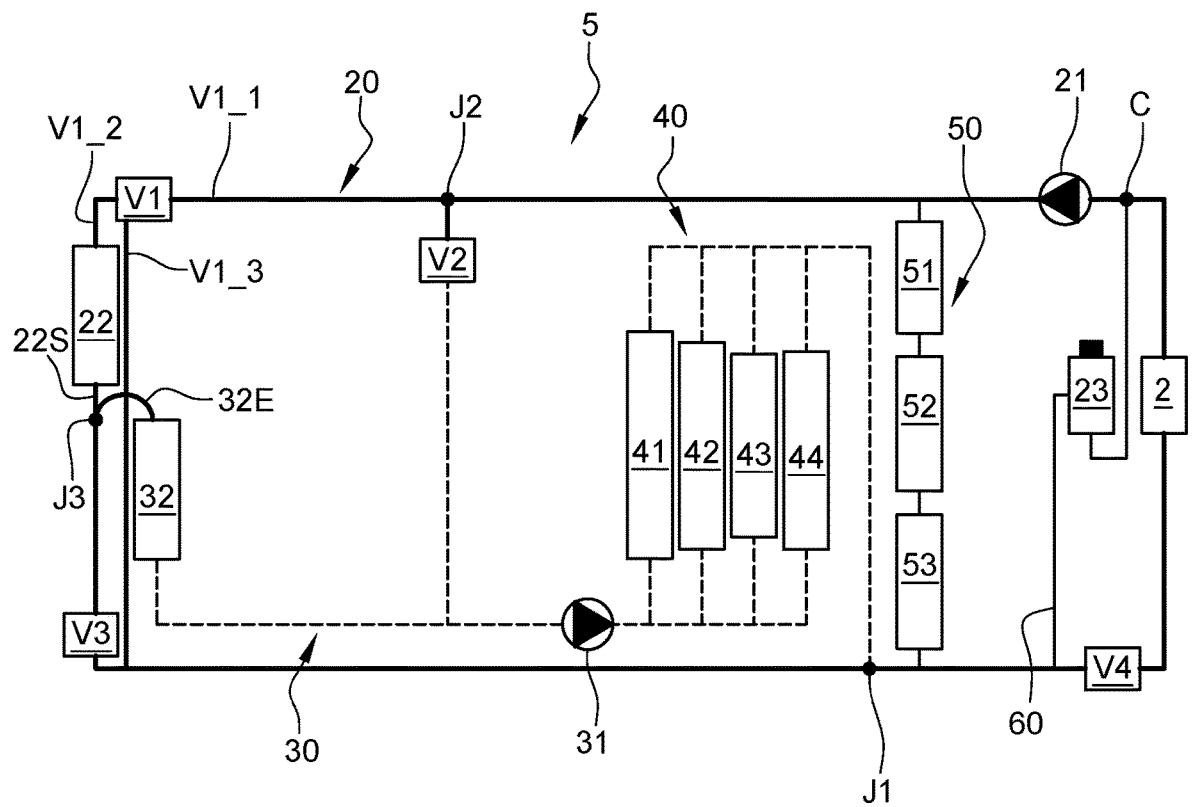
FIG. 2 is a diagram of a cooling circuit according to one embodiment.

As illustrated in FIG. 2, the cooling circuit 5 comprises two parts 20, 30.

A first part 20, illustrated using solid lines in FIG. 2, is a high-flowrate and/or high-temperature part. The first part 20 comprises a high-temperature radiator or exchanger 22. Preferably, the first part 20 is designed to cool the fuel cell 2. Preferably, the first part 20 comprises a high-flowrate pump 21, for example for a high flowrate of between 8000 l/h and 9000 l/h.

A second part 30, illustrated using broken lines in FIG. 2, is a low-flowrate and/or low-temperature part. The second part 30 comprises a low-temperature radiator or exchanger 32. Preferably, the second part 30 is designed to cool the electric motor 42 and, generally, the whole of the electric power chain 40. Advantageously, the electric traction and/or propulsion chain 40 comprises the electric motor 42, a compressor 44 and/or an intake air cooler 43, for example for supercharged intake air, and/or one or more electronic power elements 41. The term electronic power element(s) 41 means for example a power inverter and/or one or two DC voltage converters and/or a charger. The electric motor 42 may comprise an oil/water exchanger if it is cooled by oil. For example, the compressor 44 is electric and/or supplies the fuel cell with air. Preferably, the second part 30 comprises a low-flowrate pump 31, for example for a low flowrate of between 2000 l/h and 3000 l/h. Thus, the second part 30 makes it possible to cool this chain 40 by directly cooling the components thereof or coolers or exchangers integrated into or adapted to these components. Preferably, as illustrated in FIG. 2, the components of the chain 40 are arranged in parallel. Thus, the flow exiting the pump 31 may for example split to cool each component, the fluid circulating in separate ducts supplying each exchanger of each component. Preferably, the low-flowrate pump 31 is arranged upstream and in the vicinity of the chain 40.

In other words, the circuit 5 is a means for thermally managing the fuel cell 2 and the electric power chain 40.

More specifically, the low-temperature exchanger 32 comprises an intake or inlet 32E through which the fluid passes into the exchanger 32. The high-temperature exchanger 22 comprises a discharge or outlet 22S through which the fluid exits the exchanger 22. The outlet 22S of the high-temperature exchanger 22 is connected directly, or substantially directly, to the inlet 32E of the low-temperature exchanger 32. In other words, the fluid exiting the high-temperature exchanger 22 enters the low-temperature exchanger 32 directly or substantially directly. To this end, a junction J3 is arranged between the first part 20 and the second part of the circuit 5. This junction J3 is arranged between the outlet 22S and the inlet 32E so as to allow the fluid exiting the high-temperature exchanger 22 to enter the low-temperature exchanger 32, preferably directly or substantially directly. Thus, the junction J3 allows the cooling fluid to pass from the first part 20 at high pressure and/or high temperature to the second part 30 at low pressure and/or low temperature.

Preferably, the arrangement 10 comprises a heating radiator or unit heater 51 for heating the passenger compartment 6. For example, as illustrated in FIG. 2, the unit heater 51 is arranged on a branch 50 of the first part 20 of the circuit 5.

Figure 9:
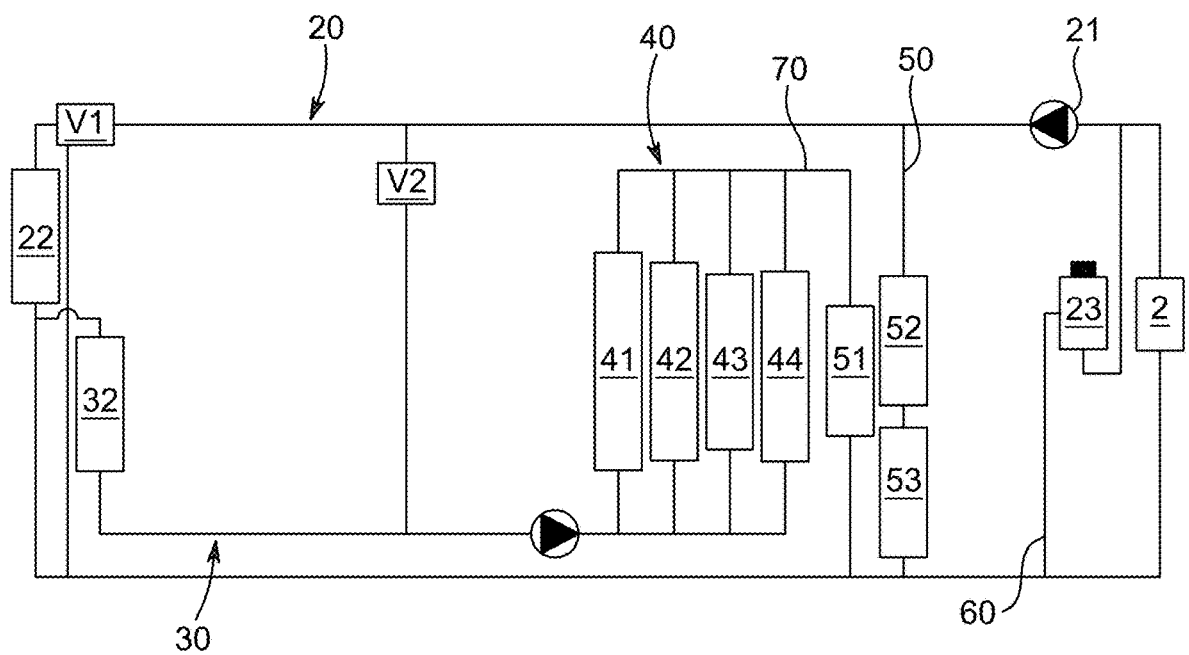
FIG. 9 is a diagram of a cooling circuit according to a variant of the embodiment.

Alternatively, as illustrated in FIG. 9, an embodiment variant comprises the unit heater arranged on the second part 30 of the circuit 5. For example, the unit heater is downstream of the cooling of the chain 40, preferably on a branch 70 of the second part 30.

Preferably, the arrangement 10 also comprises a hydrogen heater 53 and/or a deionizer 52. Preferably, this hydrogen heater and/or this deionizer are arranged on the branch 50.

Advantageously, the first part 20 and the second part 30 comprise ducts and/or hoses so as to ensure the flows or transfers of fluid between the elements to be cooled.

Thus, the fuel cell benefits from a high flowrate of cooling fluid, the fluid being driven mainly via the pump 21 on this first part 20.

Preferably, the arrangement 10 comprises a cooling fluid filling and degassing vessel 23. The circuit 5 preferably comprises a branch 60 on which the vessel 23 is installed.

Obviously, the first and second parts 20, 30 comprise ducts and/or hoses that complete them (not referenced).

As illustrated in FIGS. 2 to 9, a valve V1, preferably a three-way valve, is arranged on the first part 20. For example, as illustrated in FIG. 2, one path V1_1 of the valve V1 is connected to the pump 21. The path V1_1 makes it possible to stop the passage of the fluid or to allow it to pass to a path V1_2 and/or to a path V1_3. The passage only from the path V1_1 to the path V1_2 makes it possible to send all the fluid passing through the valve V1 to the high-temperature exchanger 22. Specifically, the path V1_2 is connected to the intake or inlet of the exchanger 22. The passage only from the path V1_1 to the path V1_3 makes it possible to send all of the fluid passing through the valve V1 to the rest of the high-pressure circuit without being cooled by the high-temperature exchanger 22. In other words, the high-temperature exchanger 22 is not passed through, i.e. the exchanger 22 is bypassed.

Preferably, as illustrated in FIG. 2, a junction J2 is arranged between the valve V1 and the pump 21. The junction J2 allows the cooling fluid to pass from the first part 20 at high pressure and/or high temperature to the second part 30 at low pressure and/or low temperature. Advantageously, as illustrated in FIGS. 2 to 9, a valve V2, for example a two-way valve, is arranged between the first part 20 and the second part 30 of the circuit 5. For example, the valve V2 is arranged between the high-pressure pump 21 and the low-pressure pump 31, for example at or substantially at the junction J2.

Figure 7:
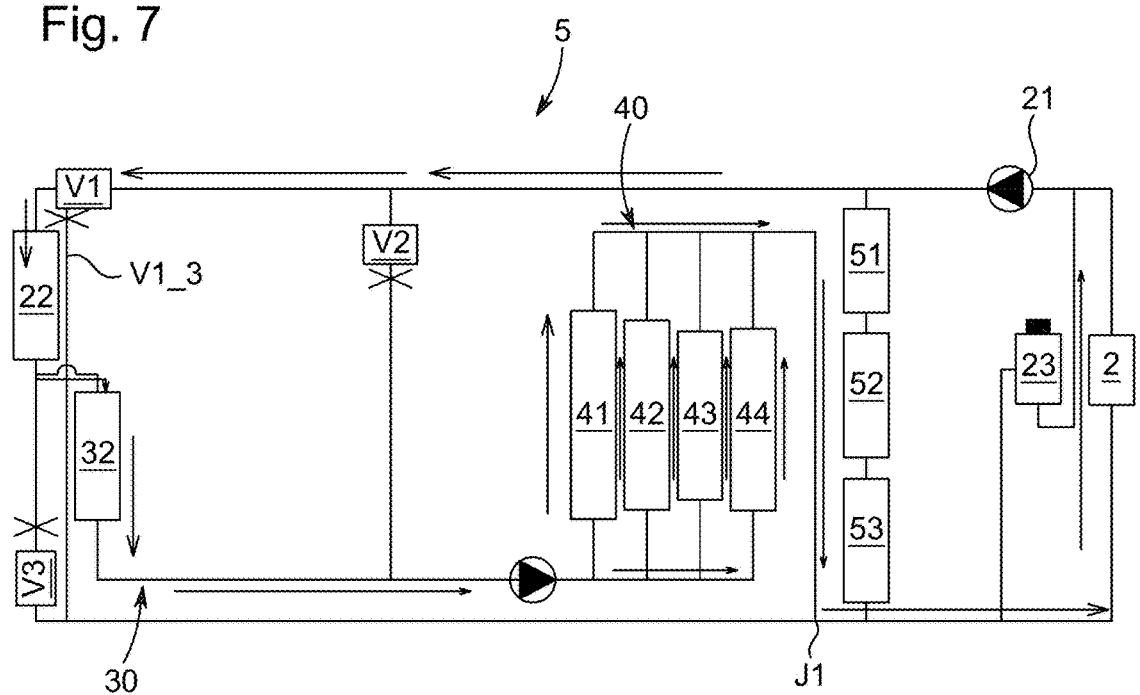
FIG. 7 is another diagram illustrating flows within the cooling circuit during the use of the traction and/or propulsion battery for moving the vehicle according to the embodiment.
Figure 8:
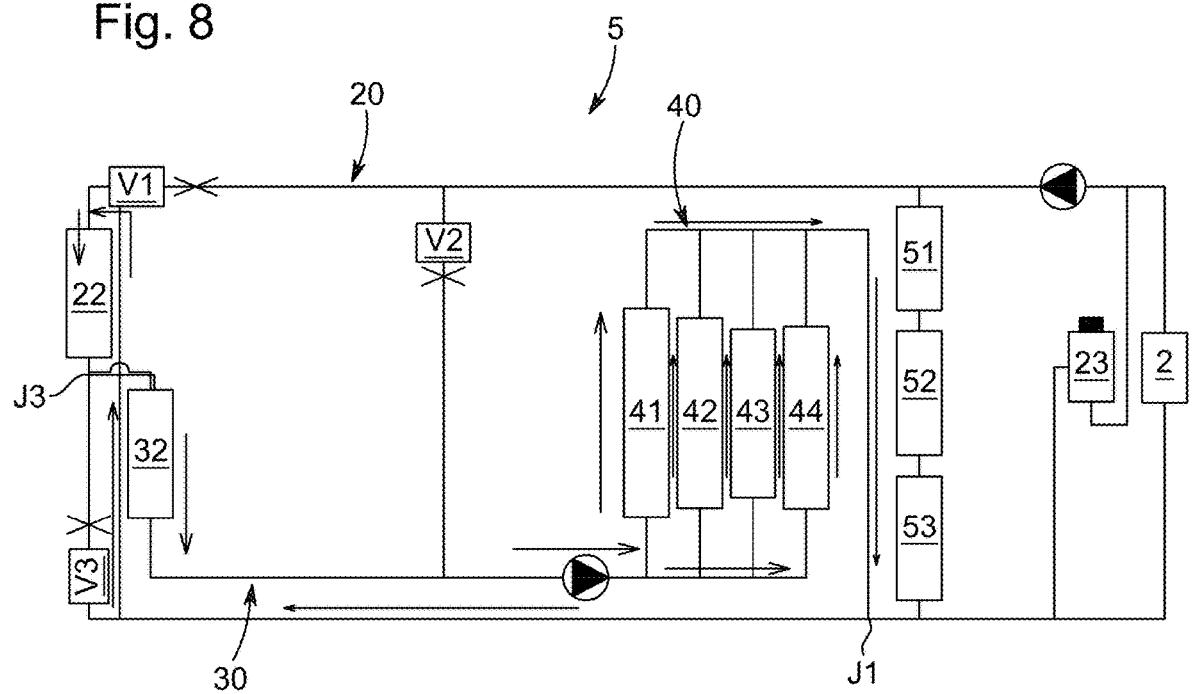
FIG. 8 is a diagram illustrating flows within the cooling circuit during the use of the traction and/or propulsion battery for moving the vehicle according to the embodiment.

Advantageously, as illustrated in particular in FIGS. 2, 7 and 8, a valve V3, for example a two-way valve, is arranged on the first part 20 of the circuit 5 downstream of the high-temperature exchanger 22. As will be seen below, this valve V3 makes it possible to stop the fluid flow in the branch in which it is located. Thus, by closing the valve V3, all the fluid exiting the high-temperature exchanger 22 is forced to enter the low-temperature exchanger 32 via the junction J3 between the first part 20 and the second part 30.

Preferably, as illustrated in FIG. 2, a junction J1 allows the cooling fluid to pass from the second part 30 at low pressure and/or low temperature to the first part at high pressure and/or high temperature. Advantageously, this junction J1 is arranged downstream of the chain 40.

To prevent the fluid from cooling the elements arranged on the branch 50, the valve V2 and the path V1_1 of the valve V1 are simultaneously closed. The fluid thus circulates without having been cooled by the exchangers 22, 32, in particular through the branch 60 extending between the junction J1 and the intake of the pump 21 where the vessel 23 is located.

For example, the fuel cell 2 is arranged between the junction J1 or substantially the junction J1 and the intake of the pump 21.

Preferably, as illustrated in FIG. 2, a valve V4, for example a two-way valve, is arranged upstream of the fuel cell 2. The valve V4 in the closed position prevents the fluid from cooling the fuel cell 2. In this case, the fluid is discharged from the branch 60 to the vessel 23.

Preferably, the pump 21 is therefore located just after the fuel cell 2, for example at the point where the return line for the fluid to the vessel 23 branches off, at a connection C (illustrated in FIG. 2). Advantageously, this inlet point of the vessel 23 is at the lowest pressure on the circuit 5. From this point, the pump 21 increases the pressure of the fluid so as to pass it toward the high-temperature radiator 22, in the case of the valve V1 connecting the paths V1_1 and V1_2.

Embodiments of methods for operating the arrangement 10 are described below.

Figure 6:
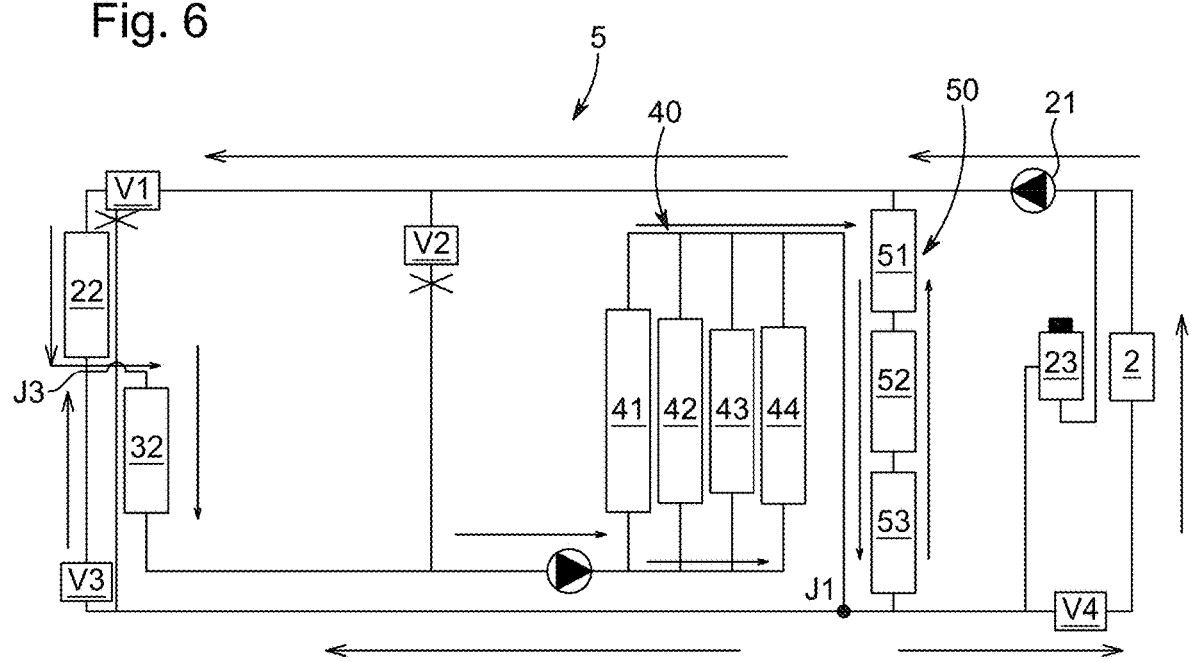
FIG. 6 is another diagram illustrating flows within the cooling circuit during the use of the traction and/or propulsion battery for moving the vehicle according to the embodiment.

FIG. 6 illustrates an embodiment in which the vehicle is running using the electrical energy stored in the battery 3 (not shown in FIG. 6). For example, the outside temperature is hot, in summer for example. Under such conditions, the chain 40 requires optimal cooling. To this end, the path V1_3 of the valve V1 is closed so as to close the bypass passage of the high-temperature exchanger 22. The valve V2 is closed, while the valves V3 and V4 are open. The fluid exiting the high-pressure pump 21 passes directly into the high-temperature exchanger 22 and then into the low-temperature exchanger 32 via the junction J3. The fluid exiting the exchanger 32 then passes through the chain 40 before splitting at the junction J1. A part of the flow passes from J1 to the low-temperature exchanger 32 after passing through the valve V3, without passing through and therefore without being cooled by the high-temperature exchanger 22. It is therefore mixed with the fluid exiting the high-temperature exchanger 22 before entering the low-temperature exchanger 32. Another part of the flow cools the branch 50 before returning to the exchanger 22. The rest of the flow from J1 passes to the fuel cell 2 before reaching the high-pressure pump 21. In this embodiment, all of the components of the electric traction and/or propulsion chain 40 benefit from optimal cooling by virtue of the two exchangers 22, 32 arranged in series. Preferably, if necessary, the pump 21 is involved in the circulation of the fluid within the circuit 5, thereby increasing the flowrate of the fluid. In this case, the two pumps operate, thereby further improving the cooling of the chain 40. In this embodiment, which is used for example in summer when it is hot, and when the vehicle is running using the electricity supplied by the battery 3 (not shown in FIG. 6), the cooling of the chain is largely improved.

FIG. 7 illustrates an improvement of the cooling of the chain 40, in particular under hot conditions, in summer for example, when the vehicle is running using the electrical energy supplied by the battery 3 (not shown in FIG. 7). The valve V3 on the main branch from the high-temperature exchanger 22 is closed, suppressing the flow in this branch. The path V1_3 of the valve V1 is closed, preventing the fluid from returning from the junction J1 to the exchanger 22. Finally, the valve V2 is closed, preventing the fluid from entering the second part 30 through it. Thus, all of the flow passing through the high-temperature exchanger 22 enters the low-temperature exchanger 32. The passage through the two radiators, first the high-temperature radiator and then the low-temperature radiator, maximizes the cooling of the fluid and consequently the cooling of the components of the chain 40. Preferably, the flow arriving at the junction J1 passes into the fuel cell 2 in order to keep it at a given temperature, or close to this given temperature. Keeping the cell at this temperature in this way favors the subsequent starting-up thereof. In this configuration, the cooling of the chain 40 is optimal.

As mentioned above, FIG. 9 illustrates a variant of the arrangement 10 at the cooling circuit 5, more specifically the second part 30. Specifically, the position of the unit heater 51 for heating the passenger compartment of the vehicle is arranged on a branch 70, for example after the junction of the ducts of each component of the chain 40. Thus, the flowrate passing through the unit heater 51 is higher since it corresponds to the total flowrate passing through the chain 40. The branch 50 comprising the deionizer then has a smaller flow.

Figure 3:
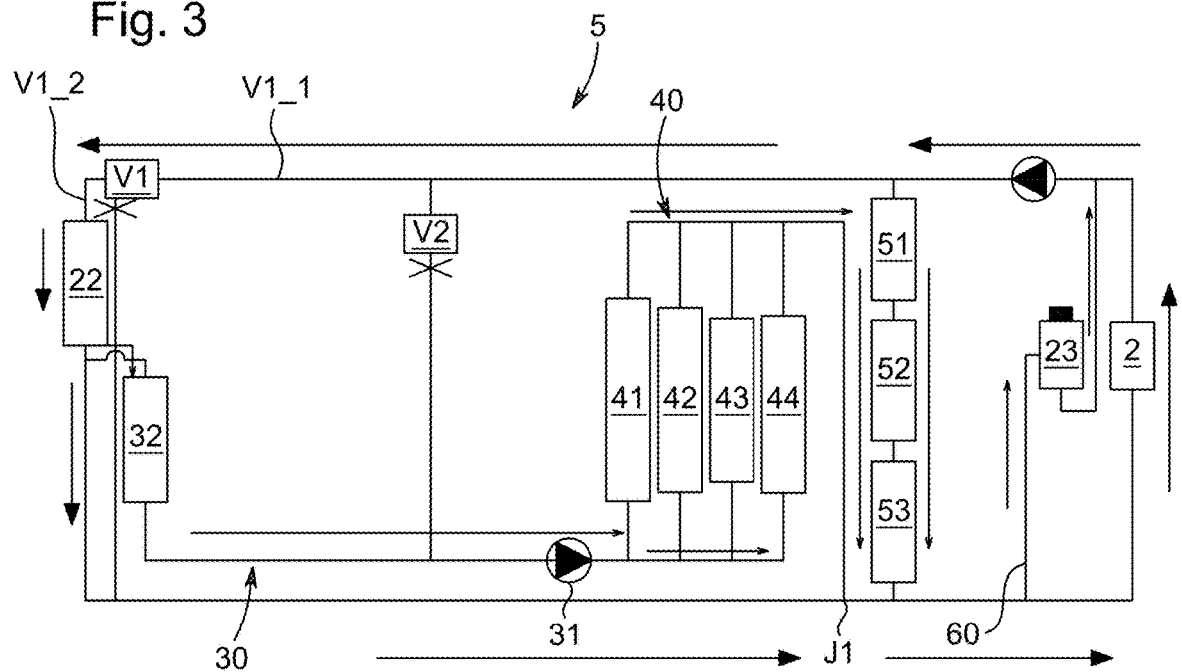
FIG. 3 is a diagram illustrating flows within the cooling circuit during the use of the electrical energy coming from a fuel cell for moving the vehicle according to the embodiment.
Figure 4:
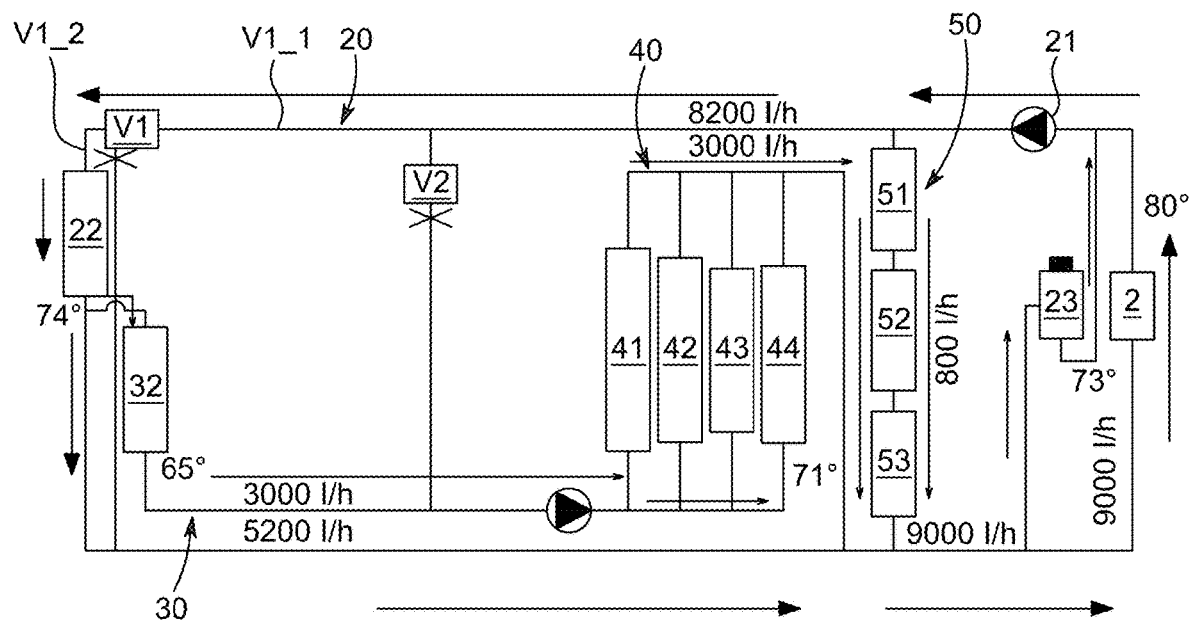
FIG. 4 is another diagram illustrating flows within the cooling circuit during the use of the electrical energy coming from the fuel cell for moving the vehicle according to the embodiment.

When the vehicle is running using the electrical energy produced by the fuel cell 2 in operation, in particular illustrated in FIGS. 3 and 4, and/or using one or more components of the chain 40. Since the fuel cell is hot, and generally the whole of the circuit is hot, cooling is necessary. The fluid admitted into the high-temperature exchanger 22 is at a first temperature.

For example, this first temperature is between 77 and 83° C. (171-181° F.), preferably around 80° C. (176° F.). The fluid leaves the high-temperature exchanger 22 at a second temperature. For example, the second temperature is between 71 and 77° C. (160-171° F.), preferably around 74° C. (165° F.). The fluid exiting the high-temperature exchanger 22 and admitted into the low-temperature exchanger 32 is, or is substantially, at the second temperature. The fluid leaves the low-temperature exchanger 32 at a third temperature. The third temperature is between 62 and 68° C. (144-154° F.), preferably around 65° C. (149° F.).

To this end, the valve V1 allows only the passage from the path V1_1 to the path V1_2. The valve V2 is then closed (illustrated by a cross) such that the fluid exiting the pump 21 does not enter the second part 30 at the valve V2. Thus, the fluid coming in particular from the fuel cell 2 is sent under pressure to the high-temperature exchanger 22 so as to be cooled. At the outlet of the exchanger 22, the total flowrate (for example around 9000 l/h) is split in two. The major part of the flowrate of the fluid that has passed through the exchanger 22, for example around 6000 l/h to 7000 l/h, returns directly to the fuel cell 2. The valves V3 and V4 (not shown in FIG. 3) are therefore open and allow the fluid to pass through. A low flowrate, for example around 2000 l/h to 3000 l/h, is drawn in by the pump 31 of the second part 30. This low flowrate circulates to the low-temperature radiator 32 to bypass the cooling of the fluid so as to drop, for example, below 65° C. (149° F.). This low flowrate then passes into the members 41, 42, 43, 44 of the electric traction and/or propulsion chain 40 (machine, electronics, etc.). The low flowrate then meets the high flowrate at the junction J1. In other words, the low flowrate passing through the second part 30 of the circuit 5 meets the first part 20 of the circuit 5 at the junction J1. Thus, at the junction J1, the fluid coming from the exchanger 22 is mixed with the fluid coming from the exchanger 32. Preferably, a smaller part, for example less than 1%, passes into the branch 60, into the vessel 23 in order to be degassed. The great majority of the fluid therefore passes through the valve V4 (open) and cools the fuel cell 2. The flow of the fluid that has passed through the components of the chain 40 thus contributes to the cooling of the fuel cell 2.

FIG. 4 illustrates an example of the distribution of the flowrates and the temperatures at various points on the cooling circuit 5, in cooling operation, when the vehicle is running using the electricity produced by the fuel cell. For example, the fluid enters the fuel cell at 73° C. (163° F.) and exits it at 80° C. (176° F.), corresponding to a thermal power of around 60 kW with a flowrate of around 9000 l/h. After the electric pump 21, a small part of the flowrate (for example around 800 l/h) passes into the branch 50, passes through the unit heater 51 in order to heat the passenger compartment 6, and/or passes through the deionizer 52, and/or heats the hydrogen via the hydrogen heater 53, for example after an expansion from around 700 bar to around 2 bar. The cold produced by this expansion may for example discharge 2 to 5 kW of heat depending on the flowrate demand and the pressure of the hydrogen in the storage tank. The rest of the flowrate exiting the pump 21, for example around 8200 l/h, enters the exchanger 22 such that its temperature passes for example from around 80° C. (176° F.) at the inlet to around 74° C. (165° F.) at the outlet. For example, the flowrate of the cooling liquid exiting the exchanger 22 and drawn in by the pump 31, in other words the fluid passing into the second part 30, is around 3000 l/h. For example, the temperature of the fluid that has passed through the low-temperature exchanger 32 after passing through the high-temperature exchanger 22, exits at a temperature of around 65° C. (149° F.). This fluid then passes through the means for cooling the components of the chain 40 so as to cool them, thereby increasing the fluid temperature at the outlet of the chain 40. Thus, the fluid of the second part 30 meeting the junction J1 has, for example, a temperature of around 71° C. (160° F.) before being mixed with a fluid flowrate from the first part 20 for example of around 5200 l/h, which has only passed through the exchanger 22. Thus, the flowrate after the junction J1, in the first part 20 of the cooling circuit 5, is again around 9000 l/h.

Before the fuel cell 2 is started up, the first part 20 and/or the second part 30 of the cooling circuit 5 heats the fuel cell 2 and/or maintains it at a predetermined temperature.

Figure 5:
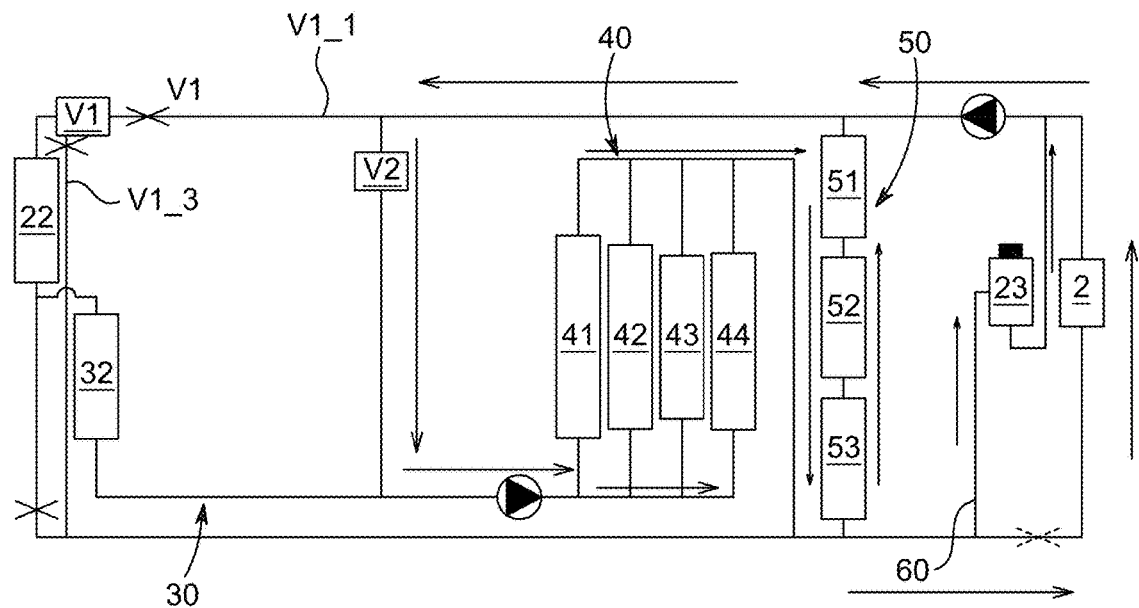
FIG. 5 is a diagram illustrating flows within the cooling circuit during the use of a traction battery and/or the fuel cell for moving the vehicle according to the embodiment.

Preferably, as illustrated in FIG. 5, a cold start-up of the vehicle is effected using the electricity from the battery 3 (not shown in FIG. 5), the fuel cell 2 being stopped. In this embodiment, the heat produced by the components of the chain 40 and/or auxiliaries of the fuel cell is used to heat the passenger compartment 6 and/or the fuel cell. In this embodiment, the path V1_1 of the valve V1 is closed so as to prevent the fluid from entering the exchanger 22. The valve V2 is open and allows the fluid to pass into the second part 30 of the circuit 5. In this case, a high flowrate passes through the chain 40. Note that the valve V3 is then closed and the path V1_3 of the valve V1 is also closed. Thus, the fluid arriving at the junction J1 after passing through the chain 40 passes toward the branch 50 and the branch 60 and toward the fuel cell 2. Specifically, in this embodiment, the valve V4 is open. In this embodiment, the fuel cell is heated, allowing better conditions for its subsequent start-up.

Alternatively, in this same embodiment, the valve V4 is closed and prevents the fluid from cooling the fuel cell (broken-line cross in FIG. 5). This configuration is advantageous in particular in the case of a battery 3 (not shown in FIG. 5) that is only slightly discharged, or even fully charged. This configuration makes it possible to increase the flowrate in the branch 50, for example to bring about better heating of the passenger compartment via the unit heater 51. Thus, before the fuel cell 2 is started up, the unit heater 51 is passed through by the fluid so as to heat the passenger compartment 6.

In winter for example, when the motor vehicle is driven and/or propelled by the fuel cell 2, and runs at low power, this being the case in particular when the vehicle is traveling in a city, for example, and when a heating setpoint for the passenger compartment 6 is high (when it is very cold, for example), the circuit in FIG. 5 may also be used. In this case, the valve 4 is open and the heat energy released by all the components of the vehicle, such as the traction chain 40 and the fuel cell, are used to heat the passenger compartment 6, the fluid not passing through the heat exchangers 22, 32.

In summary, in the embodiment illustrated in FIG. 5, the vehicle runs using the electrical energy supplied by the battery 3 (not shown in FIG. 5) while allowing significant heating of the passenger compartment and/or heating or preheating or maintaining the temperature of the fuel cell in order to make it easier to use subsequently. Note that in winter and/or when it is very cold, when the fuel cell supplies the electric motor, its heat released into the cooling fluid can be used for heating the passenger compartment.

When the fuel cell 2 is not in use, preferably the high-flowrate pump 21 is stopped. More specifically, FIG. 8 illustrates a configuration of the circuit in FIG. 2 under hot conditions, in summer for example, when the vehicle is running using the electrical energy supplied by the battery 3 (not shown in FIG. 8). If there is no need to preheat the fuel cell 2, for example because the battery 3 (not shown in FIG. 8) is fully or substantially fully charged, the flow for cooling the fuel cell is suppressed. Specifically, the path V1_3 of the valve V1 is open, meaning that the valve V1 opens the bypass branch of the exchanger 22 while opening the path V1_2 so as to allow the flow toward the exchanger 22. Preferably, the path V1_1 is closed so as to prevent the inlet of fluid from the pump 21, the pump preferably being stopped. Moreover, the valve V2 is also closed. In this case, the circulation of the fluid in the branch toward the fuel cell 2 is cut. Thus, under hot conditions, the cooling of the electric traction and/or propulsion chain 40 is highly favored. This ensures optimal operation of the electric components, and consequently optimal operation of the vehicle, the vehicle running using the electrical energy from the battery 3 (not shown in FIG. 8).

Note that, as an alternative to what is illustrated in FIG. 2, depending on the operating conditions of each component (in particular the flowrate and/or the temperature of the cooling liquid), certain means for cooling components of the chain 40 may be arranged in series if their inlet temperatures are sufficiently different. For example, a means for cooling a component that requires a low cooling fluid temperature is arranged ahead, in other words upstream, of a means for cooling a component that requires a high cooling fluid temperature.

In summary, the single cooling circuit 5 makes it possible to have a high-flowrate (8000 l/h to 9000 l/h for example) and/or high-temperature (73° C. to 80° C. (163-176° F.) for example) part and a low-flowrate (2000 l/h to 3000 l/h for example) and/or low-temperature (65° C. to 70° C. (149-158° F.) for example) part. The heat energy of the first and/or second parts 20, 30, in particular coming from the means for cooling the components of the chain 40 and/or the fuel cell 2, may be recovered in order to heat the passenger compartment and/or the fuel cell before it is started up, in particular by bypassing one or even both of the exchangers 22, 32.

The total flowrate of the fluid passing through the means for cooling the components of the chain 40 may contribute, that is to say be added, to the flowrate that has only passed through the exchanger 22 and is intended to cool the fuel cell 2. This makes it possible to do away with installing a very high-flowrate pump for the fuel cell which requires a high flowrate.

The low-temperature exchanger 32 directly receives the fluid at the outlet of the high-temperature exchanger 22. Thus, the temperature of the fluid at the inlet of the low-temperature exchanger is particularly low and this has the result that the temperature at the outlet of the low-temperature exchanger is extremely low, in particular less than or equal to 65° C. (149° F.).

Thus, during the operation of the vehicle, that is to say when it is running using the electrical energy from the battery, this corresponding preferably to the main use of the vehicle, the cooling of the components of the electric traction and/or propulsion chain is maximized. Specifically, the means for cooling the components 41, 42, 43, 44 benefit from the fluid cooled by the low-temperature exchanger 32 but also cooled by the high-temperature exchanger 22, for example with greater dimensions and capacities.

Moreover, the architecture of the circuit 5 is simple, while making it possible to have a high flowrate of fluid for cooling the fuel cell without incorporating a very high-flowrate pump. The architecture allows a significant temperature difference between the maximum temperature, around 80° C. (176° F.) for example, and the minimum temperature, around 65° C. (149° F.) for example.

Thus, the vehicle has a large range. Specifically, the fuel cell 2 makes it possible to produce electricity such that, once the battery 3 is empty or substantially empty, the vehicle can continue to move using the electrical energy coming from the fuel cell. Although the temperature of the cooling liquid is, for example, limited to 65° C. (149° F.) at the inlet of each means for cooling a component to be cooled (power electronics 41, DC/DC converter, charger, electric motor 42, etc.) on the chain 40 and the fuel cell requires cooling with an entering fluid temperature greater than that of the chain 40, for example around 73° C. (163° F.), only one circuit ensures these conditions. Preferably, the temperature of the fluid at the outlet of the components of the chain 40 is around 3° C. to 5° C. (37-41° F.) higher than that at the inlet. For the fuel cell, the temperature at the outlet preferably does not exceed 80° C. (176° F.) for example. In relation to the thermal power, the fuel cell 2 releases for example five to ten times the thermal power released by the components of the chain 40. Note that the flowrate for cooling each component of the chain 40 varies for example from 300 l/h to 800 l/h depending on the power released thereby, for example with a total flowrate of around 2000 l/h to 3000 l/h. The fuel cell 2 requires for example a flowrate of 8000 l/h to 9000 l/h. For example, the thermal power to be discharged for the cell is around 60 kW and the components of the chain 40 as a whole release around 3 to 20 kW. The single cooling circuit 5, using one and the same fluid, allows these differences in power, temperature and flowrate of the cooling liquid between the components of the chain 40 and the fuel cell 2.

Thus, although the ranges of the operating temperatures of the electric power chain linked to the traction and/or propulsion battery and that of the operating temperatures of the fuel cell are not identical or even do not overlap, the solution allows these different operating temperatures, even at the same time. Moreover, the solution makes it possible to discharge the different thermal powers released, even though these are different.

Finally, as mentioned above, the solution makes it possible to adapt the cooling of the electric power chain and of the fuel cell depending on the operating phases of such a vehicle and/or the outside temperature conditions.

As an observation, the solution according to the invention therefore achieves the sought objective of ensuring temperature conditions suitable for optimal operation of the electric power chain while ensuring temperature conditions suitable for optimal operation of the fuel cell and has the following advantages:

it consumes little electrical energy, the high-flowrate pump consuming less energy than a very high-flowrate pump.

The invention claimed is:

1. An arrangement for a vehicle, comprising:
a fuel cell;
an electric traction and/or propulsion motor;
a single cooling circuit to cool the fuel cell and the electric motor via a fluid circulated within the cooling circuit, the cooling circuit comprising two parts:
a first, high-flowrate and high-temperature part comprising a high-temperature exchanger, the first part being configured to cool the fuel cell, and
a second, low-flowrate and low-temperature part comprising a low-temperature exchanger, the second part being configured to cool the electric motor,
wherein the first part comprises a high-flowrate pump upstream of the high-temperature exchanger in the first part, and the second part comprises a low-flowrate pump downstream of the low-temperature exchanger in the second part, wherein a junction is positioned directly between an outlet of the high-temperature exchanger and an inlet of the low-temperature exchanger.

2. The arrangement as claimed in claim 1, wherein the flowrate of the high-flowrate pump is between 8000 l/h and 9000 l/h, and the flowrate of the low-flowrate pump is between 2000 l/h and 3000 l/h.

3. The arrangement as claimed in claim 1, wherein the low-temperature exchanger comprises an inlet and the high-temperature exchanger comprises an outlet, the outlet of the high-temperature exchanger being directly connected to the inlet of the low-temperature exchanger.

4. The arrangement as claimed in claim 1, further comprising an electric traction and/or propulsion chain of the vehicle, the chain comprising the electric traction and/or propulsion motor, a compressor, and/or an intake air cooler, and/or one or more electronic power elements, the chain being configured to be cooled by the second part of the cooling circuit.

5. The arrangement as claimed in claim 4, further comprising a unit heater to heat a passenger compartment of the vehicle, the unit heater being arranged on a branch of the first part of the cooling circuit or being arranged on the second part of the cooling circuit,
wherein the unit heater is arranged downstream of the cooling of the chain.

6. The arrangement as claimed in claim 1, further comprising a unit heater to heat a passenger compartment of the vehicle, the unit heater being arranged on a branch of the first part of the cooling circuit or being arranged on the second part of the cooling circuit.

7. A method for operating the arrangement as claimed in claim 6, the method comprising, before the fuel cell is started up,
passing a fluid through the unit heater so as to heat up the passenger compartment.

8. A method for operating the arrangement as claimed in claim 6, the method comprising:
transmitting, when the vehicle is running with only energy from the fuel cell, and when an outside temperature is below zero, heat energy released by a traction chain of the vehicle and the fuel cell to the fluid passing through the unit heater, and
interrupting circulation of the fluid through the high- and low-temperature exchangers.

9. A motor vehicle, comprising the arrangement as claimed in claim 1.

10. A method for operating the arrangement as claimed in claim 1, the method comprising, when the vehicle is running,
admitting the fluid into the high-temperature exchanger at a first temperature, and exiting the fluid at a second temperature, and
admitting the fluid into the low-temperature exchanger at the second temperature and exiting the fluid at a third temperature.

11. The method as claimed in claim 10, wherein
the first temperature is between 77 degrees Celsius and 83 degrees Celsius,
the second temperature is between 71 degrees Celsius and 77 degrees Celsius, and
the third temperature is between 62 degrees Celsius and 68 degrees Celsius.

12. A method for operating the arrangement as claimed in claim 1, the method comprising, before the fuel cell is started up,
heating and/or maintaining a temperature of the fuel cell via the first part and/or the second part of the cooling circuit.

13. A method for operating the arrangement as claimed in claim 1, the method comprising:
stopping the high-flowrate pump when the vehicle is operated with energy from a battery.

* * * * *